United States Patent

[11] 3,624,366

| [72] | Inventor | James W. Angus |
| | | Baldwin, N.Y. |
| [21] | Appl. No. | 794,909 |
| [22] | Filed | Jan. 29, 1969 |
| [45] | Patented | Nov. 30, 1971 |
| [73] | Assignee | Kollsman Instrument Corporation |
| | | Syosset, N.Y. |

[54] VERTICAL FLIGHT PATH ERROR ALTIMETER
4 Claims, 10 Drawing Figs.

[52] U.S. Cl. .................................................. 235/150.22,
235/150.27, 244/77 D, 340/25
[51] Int. Cl. ..................................................... G06g 7/70,
G08g 5/02
[50] Field of Search .......................................... 235/150.22,
150.24, 150.26, 150.27, 150.2; 343/108, 112;
244/77 D; 340/22, 25

[56] References Cited
UNITED STATES PATENTS

| 2,987,275 | 6/1961 | Moncrieff-Yeates et al. | 244/77 |
| 3,081,969 | 3/1963 | Farris et al. | 235/150.22 X |
| 3,157,877 | 11/1964 | Tatz et al. | 343/108 |
| 3,266,040 | 8/1966 | Doniger et al. | 343/108 |
| 3,279,724 | 10/1966 | Miller | 235/150.22 X |
| 3,309,707 | 3/1967 | Tatz et al. | 235/150.22 X |

FOREIGN PATENTS

| 1,517,949 | 2/1968 | France | 235/150.2 |
| 92,519 | 10/1968 | France | |

Primary Examiner—Eugene G. Botz
Assistant Examiner—Felix D. Gruber
Attorneys—E. Manning Giles, J. Patrick Cagney, Peter S. Lucyshyn and Richard G. Kinney ABSTRACT: A vertical flight path error indicating system is disclosed for presenting an easily interpretable indication of vertical flight path error to show the direction and degree of the error and the rate of correction of the error. In the illustrative disclosure a typical approach and landing sequence is described and equipment is shown for computing the horizontal distance covered, the required corresponding altitude, and the true altitude. A signal is generated to represent the difference between required and true altitude and a movable index is positioned relative to an altitude deviation scale under the control of the signal.

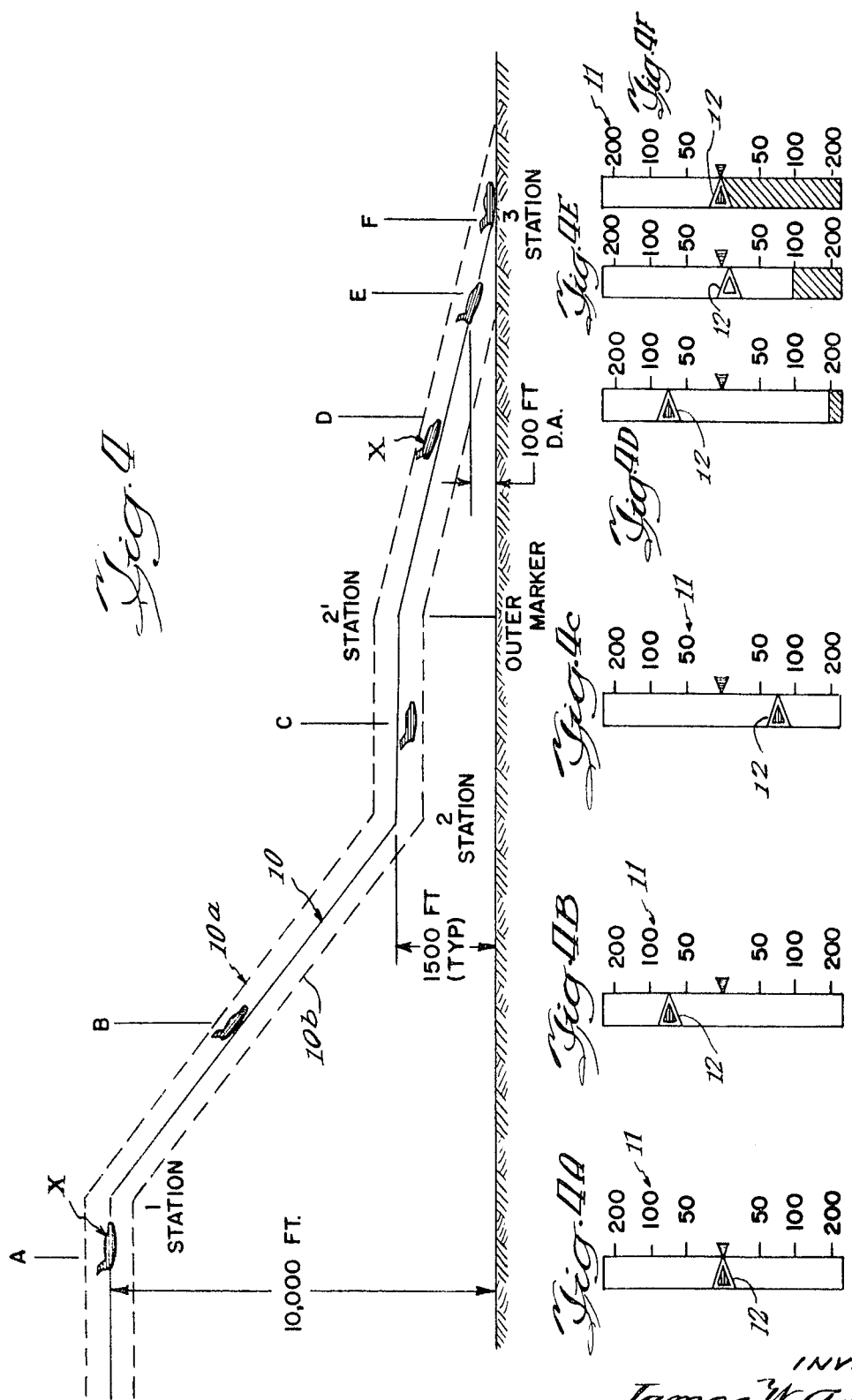

VERTICAL FLIGHT PATH ERROR ALTIMETER

BACKGROUND OF THE INVENTION

This invention relates to a programmed flight control system and more particularly is concerned with providing an improved presentation to the pilot of the vertical flight path error. To facilitate interpretation by the pilot of the vertical flight path error, the presentation should indicate the direction of the error, the degree of error and, as correction is made, should show the residual error. In order to appreciate the desirability of an improved presentation of vertical flight path error, it is well to consider the tasks of the pilot during the final minutes of a typical approach and landing operation:

ILS system is tuned and verified, altimeter setting and altitude verified just prior co crossing the outer marker, rate of descent set up, airspeed readjusted with final setting of slats, flaps and wheels, all equipment secured, contact with landing controller for final information related to other aircraft, runway and weather as well as post-landing information, watch instruments to determine that proper attitude, direction, speed, altitude and adherence to glide slope and localizer are maintained, watch outside for other aircraft, ground obstacles, runway threshold, etc.

verify crossing outer and middle marker with necessary check of instruments, and final tower communication.

To reduce the "human" error, it is necessary to change the pilot work load. In accordance with the present invention, this is accomplished by presenting the pilot with vertical flight path data in a form that minimizes the mental effort and provides for easier and more certain interpretation. Generally speaking, this is accomplished by establishing a program that relates altitude position to ground position to establish where the craft should be, monitoring the actual altitude position versus ground position for the craft, and presenting a simplified indication representing where the craft is as compared with where the craft should be.

It is contemplated that a programmed flight system may be utilized for an entire flight plan to allow the pilot to monitor the flight and correct for any nonstandard conditions that are indicated but for purposes of simplicity in the present disclosure, the system is illustrated in relation to the approach, descent and landing problem which represents the highest incidence of aircraft accidents and for which the programming of the vertical aspect of the flight is of greatest importance.

Irrespective of the scope and complexity of the programmed flight system contemplated in accordance with the present invention, the basic functions are performed by a computer that accepts programmed data, a controller to provide actual flight data and to enable comparison between the programmed and actual flight data, and a display instrument to indicate for maximum ease of interpretation where the aircraft is versus where it should be with respect to vertical position.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification and in which like numerals are employed to designate like parts throughout the same:

FIG. 4 is a profile view illustrating a typical vertical flight path pattern and illustrating the utilization of the present system for presenting easily interpretable command information for the pilot; and FIGS. 4A to 4F show altitude error presentations at selected points of the pattern depicted in FIG. 4.

DESCRIPTION OF PREFERRED EMBODIMENT

Figure 1:
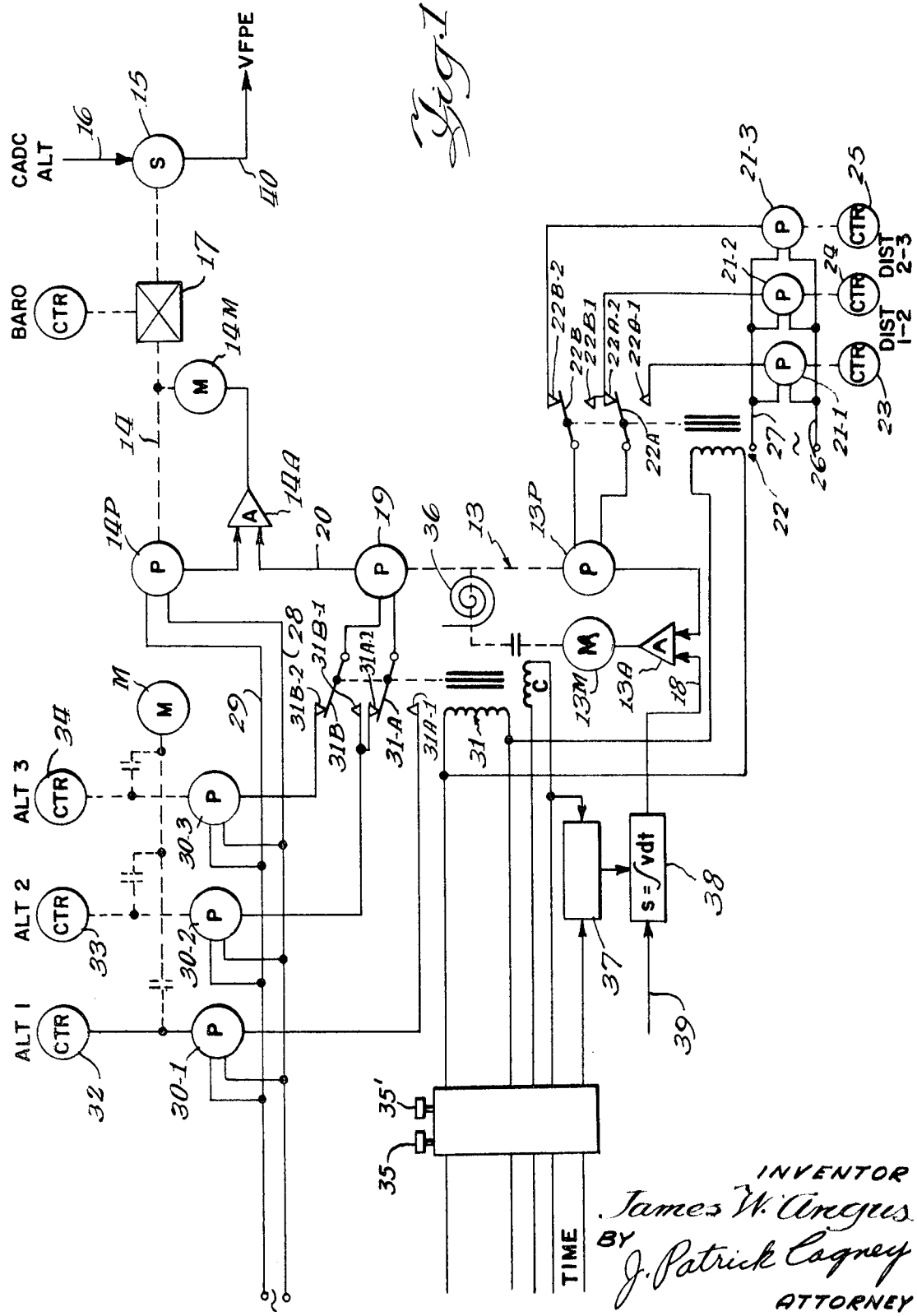
FIG. 1 is a schematic circuit diagram of a simplified form of vertical flight path error computer arrangement suited for the typical descent and landing pattern now commonly utilized.

Referring now to the drawings, a typical vertical flight path profile for the descent and landing is shown in FIG. 4 wherein the precise designated flight path is represented by the solid line 10 and the permissible deviations above and below the path are indicated by the dashed lines 10a and 10b, respectively. It will be noted that the flight path 10 includes a horizontal course A at an altitude of 10,000 feet, the end of which, as here shown, is referred to as station 1; a straight line descent course B to an altitude of 1,500 feet, the end of which, as here shown, is referred to as station 2; a shorter horizontal course C at the 1,500 foot elevation, the end of which, as here shown, is referred to as station 2'; and a final straight line descent course D to touchdown which is here referred to as station 3. An aircraft X is represented at various positions along the flight path.

Figure 2:
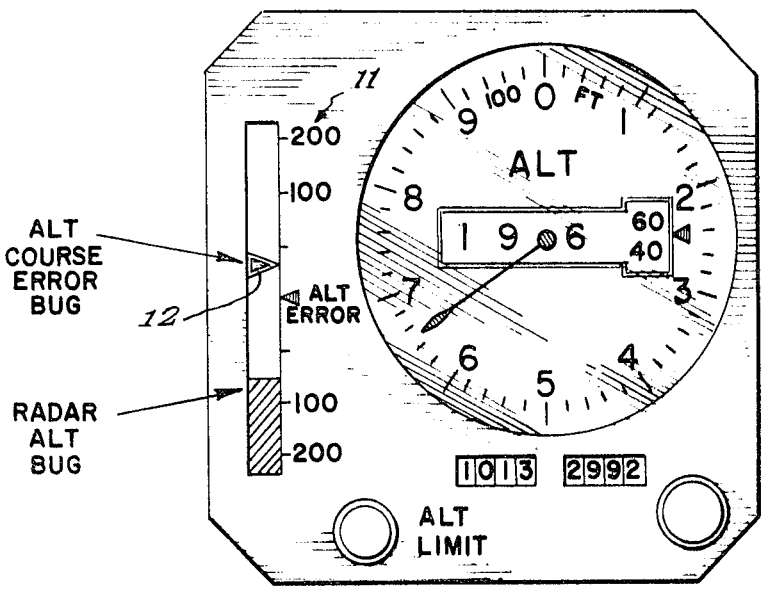
FIG. 2 is a face view of the altimeter presentation and includes the altitude error presentation.

Vertical errors of the aircraft X relative to its specified position at any given time are presented on an altitude path deviation scale 11 which forms a part of the instrument display of FIG. 2. The condition of the deviation scale 11 for the various aircraft positions in FIG. 4 is illustrated in each of FIGS. 4A to 4F wherein a movable bug 12 may be seen to provide an indication of the direction of vertical flight path error, the degree of error and, as the correction is made, a visual cue as to the rate of correction and the residual error.

In FIG. 4A, for example, corresponding to point A on the flight path, the bug 12 is at the zero position indicating the aircraft is exactly on vertical course; in FIG. 4B the bug indicates the aircraft is about 75 feet above the specified course; in FIG. 4C the bug indicates the aircraft is about 75 feet below the specified course; in FIG. 4D the aircraft is shown to be 75 feet above the course; in FIG. 4E it is only about 10 feet below the course; and at touchdown at 4F it is shown on course.

In the simplified schematic controller arrangement illustrated in FIG. 1, a horizontal position servo-loop 13 is shown including a comparison amplifier 13A, a motor 13M and a horizontal position potentiometer 13P; an altitude versus distance ratio servo-loop 14 is shown as including a comparison amplifier 14A, a motor 14M and an altitude potentiometer 14P, and a synchro 15 is shown for comparing electrically fed actual altitude data, as supplied from a computer fed line 16, with mechanically fed programmed altitude data, as supplied from the servo-loop 14 through a differential 17. Thus, the synchro 15 produces an output representative of the instantaneous altitude deviation. The horizontal distance servo-loop 13 is fed from an input line 18 supplying a signal representative of the actual distance covered and from the horizontal distance potentiometer 13P which tracks with this signal to provide mechanical positioning of an altitude versus distance ratio potentiometer 19.

The ratio potentiometer 19 provides electrical input over line 20 leading to the comparison amplifier 14A in the servo-loop 14. The signal supplied over line 20 represents the programmed altitude position corresponding to the particular distance that has actually been covered. The altitude potentiometer 14P supplies a comparison signal to the amplifier 14A such that the motor is caused to drive the synchro 15 to a mechanical position representative of the programmed altitude.

Figure 3:
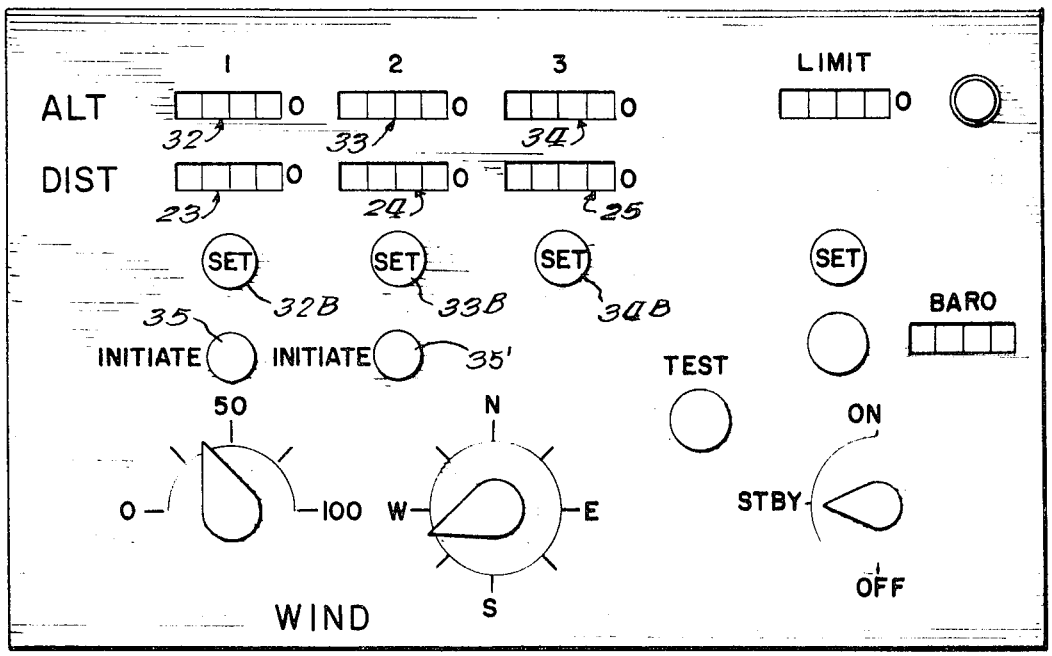
FIG. 3 is a face view of the control panel for use with the computer arrangement of FIG. 1.

In the horizontal position servo-loop 13, the distance potentiometer 13P is fed from a bank of preset distance potentiometers 21–1, 21–2, and 21–3 through a double pole double-throw switching relay 22. The relay is shown to include switch poles 22A, 22B, each selectively controlling back-to-back contacts 22A-1, 22A-2 and 22B-1, 22B-2, respectively. A separate counter 23, 24 and 25 is associated with each of the presettable potentiometers 21-1, 21-2 and 21-3 to provide a display on the control panel of FIG. 3, to permit a member of the flight crew to set each potentiometer to the required distance value, as determined by Stations 1, 2 and 3, and to verify that the correct setting has been made. The preset potentiometers 21-1, 21-2 and 21-3 are connected between common reference buses 26, 27, each to provide a predetermined level of voltage for differential connection in the supply circuit to the distance potentiometer 13P.

In the ratio servo-loop 14, the potentiometer 14P is fed from fixed voltage supply buses 28, 29 and it is mechanically positioned by the motor 14M to provide the comparison input signal to the amplifier 14A to insure that the motor drives the synchro 15 to the correct mechanical position representative of programmed altitude.

The ratio potentiometer 19 which links the servo-loops 13, 14 is fed from a bank of preset altitude potentiometers 30-1, 30-2 and 30-3 through a double-pole, double-throw switching relay 31. The altitude potentiometers are connected across the reference buses 28, 29 each settable to provide a predetermined level of voltage for differential connection in the supply circuit to the ratio potentiometer 19. The relay 31 is shown to include switch poles 31A, 31B, each selectively controlling back-to-back contacts 31A-1, 31A-2 and 31B-1, 31B-2, respectively. A separate counter 32, 33 and 34 is associated with each of the presettable potentiometers 30-1, 30-2 and 30-3 to provide a display on the control panel and to facilitate setting of the potentiometers to the required altitude values determined by Stations 1, 2 and 3. Set buttons 32B, 33B and 34B are shown on the display panel for controlling a motor M that drives each counter to its desired setting.

When the aircraft is a station 1 on the flight profile, the initiate button 35 on the control panel is actuated to energize the parallel connected relays 22, 31. The relay 22 positions the distance setting switch poles 22A, 22B to apply the differential voltage determined by preset distance pots 22-1 and 22-2 to potentiometer 13P which at this time has its wiper set to the zero percent distance point by means of the return spring 36.

Correspondingly, the relay 31 positions the altitude setting switch poles 31A, 31B to apply the differential voltage determined by preset altitude pots 30-1 and 30-2 to potentiometer 19 which has its wiper mechanically ganged with the wiper of potentiometer 13P.

The initiate button 35 also energizes a timing circuit 37 which feeds an integrator circuit 38 that is supplied with an input signal from line 39 representing true ground speed. The integrator circuit 38 produces an output representative of the actual distance covered and feeds this voltage signal over line 18 to the comparison amplifier 13A. As the craft proceeds along the course the increasing voltage applied over line 18 from the integrator 38 produces output from the amplifier 13A to drive the motor 13M and mechanically position the wiper of the distance potentiometer 13P through a tracking pattern for nulling the input signals to the amplifier 13A.

The distance versus altitude ratio potentiometer 19 is mechanically ganged with the distance potentiometer 13P so that its wiper which is connected to line 20 is mechanically positioned to cause the ratio of the horizontal distance covered to control the electrical signal that represents the corresponding ratio of the altitude difference that should have been covered between stations 1 and 2. Thus, the electrical input at line 20 represents the instantaneous altitude which the programmed flight path requires corresponding to the instantaneous horizontal position.

The electrical signal at line 20 is converted by the servo-loop 14 to a mechanical position signal appearing at the input to the synchro 15. Thus, as the aircraft is traversing the descent course B between stations 1 and 2, the programmed altitude as mechanically fed to the synchro 15 and the actual altitude as electrically fed to the synchro over line 16 are continuously being compared and any difference appears as an output altitude error signal on line 40. This altitude error signal is applied to effect positioning of the movable bug 12 relative to the altitude error scale 11.

In the example illustrated, the aircraft X is above its programmed altitude at the midpoint of the B course and an appropriate signal is applied from line 40 to position the bug 12 as shown in FIG. 4B to indicate that the aircraft is about 75 feet above its flight line. The pilot will therefore adjust the flight line to gradually bring the bug to a zero error position.

As the craft reaches station 2, the ratio potentiometers 13P and 19 reach a 100 percent ratio point and remain at such point while the craft proceeds along the C course. In the illustration, the aircraft X is shown below the programmed altitude at C and during this time the movable bug 12 is below the zero difference point of the scale 11 as shown in FIG. 4C.

When the aircraft reaches Station 2' at the end of course C, an initiate button 35 is actuated to reverse the condition of relays 22, 31. Relay 22 then positions switch poles 22A, 22B as shown in FIG. 1 to apply differential voltage determined by preset pots 22-2 and 22-3 to potentiometer 13P which is reset to the zero ratio position by the return spring 36. Correspondingly relay 31 positions the altitude setting switch poles 31A, 31B to apply the differential voltage determined by altitude pots 30-2 and 30-3 to potentiometer 19. The initiate button 36 also recycles the circuits 37 and 38 so that the signal applied over line 18 increases as the horizontal distance along course D is covered. Again the ratio of the distance covered is mechanically generated at potentiometers 13P and 19 to provide an electrical signal at line 20 representative of the programmed altitude position. A corresponding mechanical position signal is applied at the synchro 15 for comparison with the actual altitude signal on line 16 to produce the altitude difference signal on line 40.

In the illustrations, the aircraft is shown at D, above programmed altitude and the bug 12 is shown in FIG. 4D about 75 feet above desired altitude. The aircraft is shown approximately on course at E and the bug is correspondingly shown only slightly below the zero error point on the scale 11 in FIG. 4E.

It has been shown that where deviations exist between the actual altitude and the programmed altitude, an error signal proportional to such deviation is generated and applied to position the movable bug 12 in accordance with the extent and direction of the error to provide instantaneous guidance for the pilot during the programmed flight. The guidance information is in command form in that it immediately directs the pilot as to the relative altitude and, as correction is made, the pilot is instantaneously aware of the rate of correction that is being effected so that the correction can be carried out in optimum fashion.

For purposes of disclosure, a simplified approach and descent pattern controlled by a simplified computer control system has been illustrated. An entire flight can be similarly programmed and controlled and, where necessary, more sophisticated computer control equipment is contemplated for more complex flight program requirements.

Thus, while preferred constructional features of the invention are embodied in the structure illustrated herein, it is to be understood that changes and variations may be made by those skilled in the art without departing from the spirit and scope of the appended claims.

I claim:

1. In a vertical flight path control system for an aircraft that includes actual flight data input means for providing a first signal representative of horizontal distance traveled by the aircraft and a second input signal representative of actual altitude of the aircraft, apparatus for programming a desired vertical flight path and for comparing actual altitude with programmed altitude corresponding to the horizontal position of the aircraft along the desired flight path, said apparatus comprising first means settable in accordance with the horizontal distance to be traveled by the aircraft along the desired flight path and responsive to said first input signal to provide a horizontal distance reference signal representative of the instantaneous proportion of the horizontal distance of the desired flight path traveled by the aircraft, second means settable in accordance with the altitude at which the aircraft is to fly at predetermined locations along the desired flight path and responsive to said horizontal reference signal to produce an altitude reference signal representative of programmed altitude corresponding to the instantaneous horizontal location of the aircraft along the desired flight path, and third means responsive to said second input signal and said altitude reference signal for producing an error signal representative of the deviation between actual altitude and programmed altitude.

2. In a vertical flight path control system in accordance with claim 1 wherein said first means includes means controlled by said first input signal and responsive to a preset horizontal distance difference signal for presenting said horizontal reference signal as output.

3. In a vertical flight path control system in accordance with claim 1 wherein said first means includes means controlled by said first input signal and responsive to a preset horizontal distance difference signal for presenting said horizontal reference signal as output, and wherein said second means includes means controlled by said horizontal reference signal and responsive to a preset altitude difference signal for presenting said altitude reference signal as output.

4. In a vertical flight path control system in accordance with claim 1 wherein said first means includes a distance potentiometer having a movable wiper, means including a pair of potentiometers connected to determine a selected voltage range across said distance potentiometer representative of the horizontal distance of the desired flight path, and control means responsive to said first input signal for moving said wiper in accordance with the proportion of the horizontal distance of the desired flight path traveled by the aircraft, and wherein said second means includes an altitude potentiometer having a movable wiper, means including a pair of potentiometers connected to determine a selected voltage range across said altitude potentiometer representative of altitude variation of the desired flight path, said control means including mechanical means for moving the wiper of said altitude potentiometer in ganged relation with the wiper of said distance potentiometer whereby said horizontal reference signal is in the form of mechanical position.

* * * * *